United States Patent
Glück et al.

(10) Patent No.: US 6,310,109 B1
(45) Date of Patent: Oct. 30, 2001

(54) PROCESS FOR THE PREPARATION OF POLYMER PARTICLES

(75) Inventors: Guiscard Glück, Mainz; Klaus Hahn, Kirchheim; Roland Gellert, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/646,097

(22) PCT Filed: Mar. 19, 1999

(86) PCT No.: PCT/EP99/01837

§ 371 Date: Sep. 20, 2000

§ 102(e) Date: Sep. 20, 2000

(87) PCT Pub. No.: WO98/01489

PCT Pub. Date: Jan. 15, 1998

(30) Foreign Application Priority Data

Mar. 24, 1998 (DE) .............................................. 198 12 858

(51) Int. Cl.$^7$ ........................................................ C08J 9/20
(52) U.S. Cl. .................................. 521/56; 521/82; 521/64
(58) Field of Search .................................................. 521/56

(56) References Cited

FOREIGN PATENT DOCUMENTS

98/01489 * 1/1998 (WO).

* cited by examiner

Primary Examiner—Morton Foelak
(74) Attorney, Agent, or Firm—Oblon, Spivak, McClelland, Maier & Neustadt, P.C.

(57) ABSTRACT

The invention relates to a process for preparing styrene polymers comprising water as sole blowing agent, by polymerizing styrene in aqueous suspension. The polymerization is carried out in the presence of from 5 to 30% by weight of recycled EPS material dissolved in styrene and comprising customary coating agents deriving from production of the EPS.

4 Claims, No Drawings

PROCESS FOR THE PREPARATION OF POLYMER PARTICLES

The invention relates to a process for preparing water-expandable polystyrenes (WEPS) by polymerizing styrene in aqueous suspension, where the suspended styrene droplets comprise an emulsion of finely dispersed water.

Expandable polystyrene (EPS) beads are normally prepared by polymerizing styrene in aqueous suspension in the presence of a volatile organic blowing agent. The usual blowing agents are hydrocarbons, in particular pentane. In order to protect the environment, pentane emitted during the production and processing of EPS has to be reclaimed. This is complicated and costly. In the longer term, therefore, it would be useful to replace these organic substances with blowing agents which are less hazardous, for example water.

Eindhoven University 1997 dissertation by J. J. Crevecoeur "Water Expandable Polystyrene" describes a process for preparing WEPS by firstly preparing a fine emulsion of water in styrene with the aid of surface-active substances, polymerizing the styrene to a conversion of 50%, suspending the mixture in water with phase inversion, and finally polymerizing the styrene to completion with the aid of peroxide initiators. The surface-active substances used comprise amphiphilic emulsifiers, e.g. sodium bis(2-ethylhexyl) sulfosuccinate or sodium styrenesulfonate, or block copolymers made of polystyrene blocks and of polystyrenesulfonate blocks. All of these substances have both a hydrophilic and a hydrophobic radical and are therefore able to emulsify water in styrene.

A disadvantage of this process is that it is carried out in two stages: water is first emulsified in the styrene/polystyrene mixture and then the organic phase is suspended in water, with phase inversion.

It is an object of the present invention, therefore, to develop a simpler, single-stage process for preparing WEPS.

We have found that this object is achieved by carrying out the suspension polymerization in the presence of 5 to 30% by weight, preferably from 10 to 25% by weight, of recycled molded polystyrene foam (recycled EPS material). Recycled EPS material is obtained from treatment of EPS foams, e.g. of packaging materials or insulating materials. After the surfaces of these materials have been cleaned, the materials are comminuted, e.g. by grinding or chopping, producing flakes of foam with sizes of from 5 to 50 mm. These flakes are washed, dried, compacted and extruded to give pellets. For the novel process these pellets are then dissolved in styrene, and the solution is suspended in water and polymerized.

Pelletized EPS material generally comprises from 0.1 to 2% by weight, preferably from 0.2 to 1% by weight, of coating agents deriving from production of the EPS. These were applied to the EPS beads once they had been produced. The majority of these coating agents are amphiphilic compounds dispersed or dissolved in the styrene solution, and for the purposes of the present invention they act as emulsifying agents. Examples of coating agents are antistats, such as quaternary ammonium alkylsulfonates, aliphatic sulfonates and oxalkylated ammonium salts; anticaking agents, such as metal salts of fatty acids, e.g. zinc stearate, or else fatty esters and fatty amides; or agents for reducing cooling time, for example glycerol esters or hydrophobic esters of fatty acids or of fatty alcohols, e.g. glycerol monostearate or tristearyl citrate.

In the novel suspension polymerization it is preferable for styrene to be the only monomer used. However, up to 20% of the weight of styrene may have been replaced by other ethylenically unsaturated monomers, such as alkylstyrenes, divinylbenzene, acrylonitrile, 1,1-diphenylethene or α-methylstyrene.

In the suspension polymerization the customary auxiliaries may be added, e.g. suspension stabilizers, free-radical initiators, flame retardants, chain transfer agents, expansion aids, nucleating agents or plasticizers. It is advantageous for the suspension stabilizers used to be inorganic Pickering dispersing agents, e.g. magnesium pyrophosphate or tricalcium phosphate, in combination with small amounts of alkylsulfonates. Preferred flame retardants are organic bromine compounds, e.g. hexabromocyclododecane, added in amounts of from 0.1 to 2% by weight, based on the total of styrene and recycled material.

It is appropriate for the suspension polymerization to be carried out in two temperature phases, using two peroxide initiators decomposing at different temperatures. The suspension is first heated to 80–90° C., whereupon the first peroxide, e.g. dibenzoyl peroxide, decomposes and the polymerization is initiated. The temperature is then slowly allowed to rise to 100–140° C., whereupon the second peroxide, e.g. dicumyl peroxide or di-tert-butyl perbenzoate, decomposes.

The WEPS beads obtained from the suspension polymerization comprise, depending on the amount of recycled EPS material used and on the content of coating agents, from 2 to 20% by weight, in particular from 5 to 15% by weight, of water. Their bead size is from 0.2 to 5 mm, preferably from 0.5 to 2 mm. They may be foamed using air at from 110 to 140° C., or using superheated steam, to give foam beads. A particularly elegant foaming process which gives foam beads of very low bulk density is described in the German Patent Application P 198 12 854.1.

Like conventional EPS foam beads, the WEPS foam beads can be fused to give foam sheets, foam slabs or foam moldings, used as insulating materials or packaging materials.

All percentages in the examples are by weight.

Example 1

3.70 kg (20%) of pelletized recycled EPS with a content of 0.6% of coating agent is dissolved in 14.95 kg of styrene with admixture of 44.85 g of dicumyl peroxide and 7.48 g of dibenzoyl peroxide. The organic phase is introduced into 19.5 l of demineralized water in a 50 l mixing vessel. The aqueous phase comprises 105.1 g of sodium pyrophosphate and 194.6 g of Epsom salts. The suspension is heated to 80° C. and 5.26 g of sodium $C_{15}$-alkylsulfonate are added, whereupon the suspension stabilizer system forms. Finally, the polymerization is completed at 133° C. This gives compact bead-shaped pellets comprising 12% of water.

The pellets are foamed using air at 130° C., whereupon the beads expand to one tenth of their initial bulk density of 600 g/l. The prefoamed beads are then freed from residual water in a stream of dry air at 70° C. Finally, the beads are further foamed in a conventional prefoamer for EPS, using steam. After foaming three times with steam and removing residual water by drying between each foaming, the foam beads obtained have a bulk density of 10 g/l.

Example 2

1.66 kg (10%) of recycled EPS is dissolved in 14.95 kg of styrene with admixture of 44.85 g of dicumyl peroxide and 7.48 g of dibenzoylperoxide. The organic phase is introduced into 19.5 l of demineralized water in a 50 l mixing vessel. The aqueous phase comprises 105.1 g of sodium pyrophosphate and 194.6 g of Epsom salts. The suspension is heated to 80° C. After 140 minutes, 5.26 g of alkylsulfonate are added. Finally, the polymerization is completed at 133° C. This gives compact bead-shaped pellets comprising 7% of water.

The pellets are foamed as described in Example 1.

We claim:

1. A single-stage process for preparing styrene polymers comprising water as sole blowing agent by polymerizing styrene, optionally together with comonomers, in aqueous suspension, where the suspended styrene droplets comprise an emulsion of finely divided water, and an emulsifying agent is present, which comprises carrying out the polymerization in the presence of from 5 to 30% by weight of recycled molded polystyrene foam (recycled EPS material), wherein the recycled EPS material is dissolved in styrene, and the solution is suspended in water and then the suspension polymerization is carried out.

2. A process as claimed in claim 1, wherein the recycled EPS material comprises from 0.1 to 2% by weight of customary coating agents deriving from preparation of the EPS, and these act as emulsifying agents.

3. A process as claimed in claim 2, wherein the coating agents are antistats, anticoagulants and/or agents for reducing the cooling time.

4. A process of producing a foam comprising foaming the styrene polymers produced in claim 1, wherein said styrene polymers comprise from 2 to 20% by weight of water.

* * * * *